US010237309B2

(12) United States Patent
Furuichi et al.

(10) Patent No.: US 10,237,309 B2
(45) Date of Patent: Mar. 19, 2019

(54) MANAGING VIRTUAL DESKTOP INFRASTRUCTURE DATA SHARING

(71) Applicant: International Business Machines Corporation, Armonk, NY (US)

(72) Inventors: Sanehiro Furuichi, Tokyo (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/951,604

(22) Filed: Nov. 25, 2015

(65) Prior Publication Data

US 2017/0149853 A1 May 25, 2017

(51) Int. Cl.
*H04L 29/06* (2006.01)
*G06F 9/455* (2018.01)
*H04L 29/08* (2006.01)
*G06F 9/451* (2018.01)
*G06F 9/44* (2018.01)
(Continued)

(52) U.S. Cl.
CPC .......... *H04L 65/403* (2013.01); *G06F 9/4445* (2013.01); *G06F 9/44505* (2013.01); *G06F 9/452* (2018.02); *G06F 9/45558* (2013.01); *G06F 21/00* (2013.01); *H04L 67/10* (2013.01); *H04L 67/18* (2013.01); *H04L 67/38* (2013.01); *G06F 2009/45595* (2013.01)

(58) Field of Classification Search
CPC ....... H04L 65/403; H04L 67/38; H04L 67/10; H04L 67/18; G06F 21/00; G06F 9/44505; G06F 9/4445; G06F 9/45558; G06F 2009/45595
See application file for complete search history.

(56) References Cited

U.S. PATENT DOCUMENTS

| 8,650,307 | B2 | 2/2014 | Miller |
| 8,966,093 | B2 | 2/2015 | Smyth et al. |
| 9,084,235 | B2 * | 7/2015 | Steer .................. H04L 63/0876 |

(Continued)

OTHER PUBLICATIONS

Li, et al., "CyberLive App: A secure sharing and migration approach for live virtual desktop applications in a cloud environment", Future Generation Computer Systems vol. 29, Issue 1, Jan. 2013 (Abstract). Last printed Sep. 9, 2015, 3:59 PM. 3 pages. http://www.sciencedirect.com/science/article/pii/S0167739X11001403.

(Continued)

*Primary Examiner* — Philip J Chea
*Assistant Examiner* — Wuji Chen
(74) *Attorney, Agent, or Firm* — Michael Purdham

(57) ABSTRACT

A first request to host a desktop environment within a virtual machine is detected. The first request originates from a first remote device. The first remote device is at a first location. A second request to host a desktop environment within the virtual machine is detected. The second request originates from a second remote device. The second remote device is at a second location. The second desktop environment is qualified to share data with the first computing desktop environment. The first and second remote devices are determined to be qualified to share a desktop environment. One or more shared desktop environments are hosted for the first and second device, wherein the first and second device share the one or more shared desktop environments.

19 Claims, 3 Drawing Sheets

(51) Int. Cl.
  *G06F 9/445* (2018.01)
  *G06F 21/00* (2013.01)

(56) References Cited

U.S. PATENT DOCUMENTS

| | | | |
|---|---|---|---|
| 2004/0024890 A1* | 2/2004 | Baek | H04L 63/10 |
| | | | 709/229 |
| 2012/0185291 A1* | 7/2012 | Ramaswamy | G06Q 10/1095 |
| | | | 705/7.19 |
| 2013/0191903 A1* | 7/2013 | Jaudon | H04L 63/08 |
| | | | 726/7 |
| 2013/0339439 A1* | 12/2013 | Deng | H04L 67/1095 |
| | | | 709/204 |
| 2013/0346494 A1* | 12/2013 | Nakfour | H04L 67/1095 |
| | | | 709/204 |
| 2014/0115175 A1* | 4/2014 | Lublin | G06F 9/4856 |
| | | | 709/228 |
| 2014/0304779 A1* | 10/2014 | Lee | H04L 63/10 |
| | | | 726/4 |
| 2014/0379827 A1 | 12/2014 | Eom et al. | |
| 2015/0012831 A1* | 1/2015 | Boggess | G06F 3/1454 |
| | | | 715/733 |
| 2015/0095419 A1* | 4/2015 | Anantharaman | H04L 67/10 |
| | | | 709/204 |
| 2015/0304121 A1* | 10/2015 | Wu | H04L 12/1822 |
| | | | 709/204 |
| 2016/0378417 A1* | 12/2016 | Kenjalkar | G06F 3/1423 |
| | | | 345/2.2 |
| 2017/0111761 A1* | 4/2017 | Tarlton | G06F 9/45558 |

OTHER PUBLICATIONS

Nejafp, "Transfer active Remote Desktop Sessions from One Supporter to Another", Posted on Apr. 17, 2013. Last printed Aug. 10, 2015, 12:32 PM. 3 pages. http://blog.islonline.com/2013/04/17/transfer-active-remote-desktop-sessions-from-one-supporter-to-another/.

Unknown, "Remote Desktop Services", Wikipedia, the free encyclopedia. Last printed Nov. 23, 2015, 10:11 AM. 7 pages. https://en.wikipedia.org/wiki/Remote_Desktop_Services.

Furuichi, et al., Method and Propagating Authentication Between Terminals, and Server and Computer Program Therefor, Filed Jan. 14, 2014. Application No. JP2014/050477. 11 pages.

* cited by examiner

MANAGING VIRTUAL DESKTOP INFRASTRUCTURE DATA SHARING

BACKGROUND

The present disclosure relates to computer systems, and more specifically, to managing virtual desktop infrastructure (VDI) between a host and remote computing devices. A host may create a computing desktop environment for a remote computing device. While hosted, the remote computing device may access software applications which are associated with the computing desktop environment. Any data processed or created by the software applications on the computing desktop environment may be saved at locations other than the remote computing device.

SUMMARY

Aspects of the disclosure include a system, a method, and a computer program product for managing virtual desktop infrastructure (VDI). A first request to host a computing desktop environment within a virtual machine may be detected. The first request may originate from a first remote device. The first request may have a first set of characteristics that includes a first location. A second request to host a second computing desktop environment within the virtual machine may be detected. The second request may originate from a second remote device. The second request may have a second set of characteristics that includes a second location. The first and second remote devices may be qualified to share computing desktop environments. The remote devices may be determined to be qualified by determining that the first location and the second location are close enough to satisfy a proximity threshold. One or more shared desktop environments may be hosted for the first and second device, such that the first and second device share the one or more shared desktop environments.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
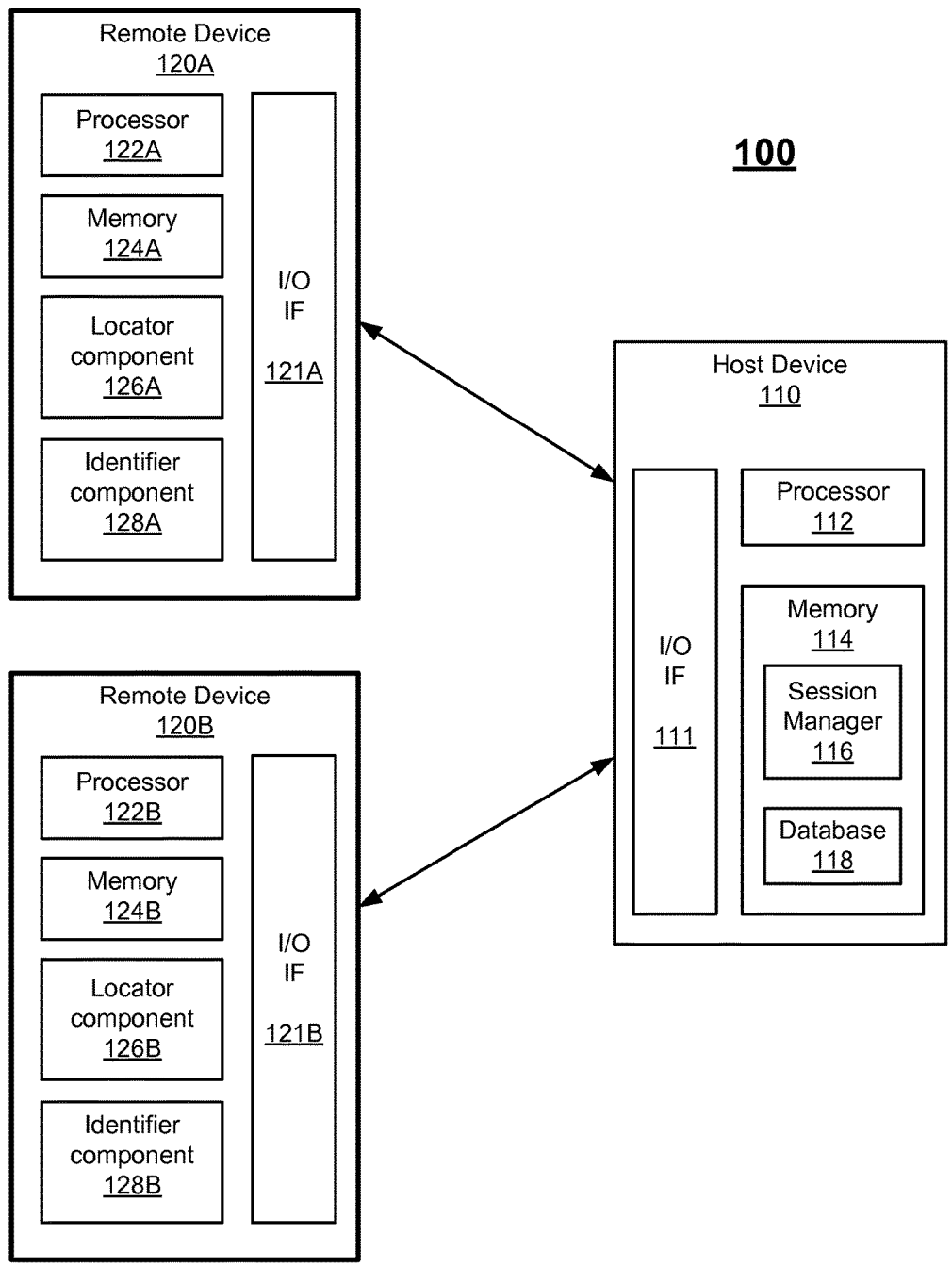
FIG. 1 depicts a block diagram of an example computing environment with a host and remote devices, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a system and method for managing virtual desktop infrastructure (VDI) implementation. A central computing device may host virtual desktop environments for remote devices. A plurality of remote devices may request desktop environments from the host from essentially the same location. The host may determine that the plurality of remote devices are qualified to share a virtual desktop environment. While the present disclosure is not necessarily limited to such applications, various aspects of the disclosure may be appreciated through a discussion of various examples using this context. Examples and example values discussed herein are provided by way of example only and are not to be construed as limiting.

Conventional storage computing networks may include a conventional host that hosts virtual desktops for remote devices. A user may have access to a plurality of remote devices which may gain access to a virtual desktop from the conventional host. A user may request access to a virtual desktop from the conventional host from a first device. The conventional host may evaluate the first device and host a first virtual desktop. When a user requests that a second device gain access to the first virtual desktop, the conventional host may not have a way to determine if the second device is qualified to gain access to the first virtual desktop. This may result in the conventional host not having the ability to allow numerous devices to securely share virtual desktops across a plurality of remote devices.

Aspects of the present disclosure relate to managing virtual desktops. One or more users may be using a plurality of remote devices in conjunction. The remote devices may all be in the same general location, for example all being in the same complex, building, room, or a non-structured radius (e.g., a ten-foot radius). A host (e.g., VDI server) may host virtual desktops. A user may request that the VDI server host virtual desktops for two remote devices. The VDI server may determine that the two remote devices satisfy a proximity threshold by identifying that the two remote devices are in the same complex, building, room, or non-structured radius, to list a few non-limiting examples. In response to determining that the two remote devices satisfy the proximity threshold, the VDI server may allow the two remote devices to share virtual desktops. By verifying that remote devices are qualified to share virtual desktops and, as a result, allowing said remote devices to share virtual desktops, the VDI server may increase the security and scalability of VDI solutions.

Referring now to FIG. 1, a block diagram of an example computing environment 100 for managing VDI implementations is depicted, according to embodiments of the present disclosure. In some embodiments, the computing environment 100 can include one or more remote devices 120A, 120B and one or more host devices 110. While FIG. 1 depicts an embodiment with one host device 110 and two remote devices 120A, 120B, other embodiments with more host devices 110 and more or less remote devices 120 are also possible. The remote devices 120 and host device 110 can be geographically removed from each other and communicate over a network. In some embodiments, the network may include any type of network, including a local area network (LAN), a wide area network (WAN), or a connection made through the Internet using an Internet Service Provider.

The host device may be a VDI server as described herein. The host device 110 may include a processor 112, a memory 114, and an input/output (I/O) interface (IF) 111. The memory 114 may store applications whose instructions may be executed by the processor 112. These instructions may include operations from the session manager 116 which are described in more detail below with respect to method 200. The session manager 116 may manage virtual desktops for the remote devices 120. Managing virtual desktops for the remote devices may include hosting individual virtual desktop environments for respective remote devices 120 or creating virtual desktop environments which may be shared by a plurality of remote devices 120. The session manager 116 may qualify remote devices 120 via transmissions sent through the I/O IF 111 before allowing the remote devices 120 to share, in some cases using a database 118 which includes data on qualification (e.g., proximity thresholds, user identifiers, user rights, etc.)

A remote device 120 may include an I/O interface 121, memory 124, a processor 122, a locator component 126, and an identifier component 128. The processor 122 may execute instructions from operations stored on the memory 124, including operations from method 200 below such as gathering location data regarding the remote device 120 or user identification data regarding the user of the remote device 120. The memory 124 may include a program which includes instructions to request a virtual desktop environment. The processor 122 may execute these instructions, such as, for example, sending a request for a virtual desktop environment to the host device 110 using the I/O interface 121 of the remote device 120. The host device 110 may intake this request through an I/O interface 111, at which point the session manager 116 may host a virtual desktop using the processor 112.

The two remote devices 120A, 120B may share a virtual desktop environment created by the host device 110. In some embodiments, the two remote devices 120A, 120B may submit a request using respective I/O interfaces 121A, 121B to share one or more virtual desktop environments, in response to which the host device 110 may determine if the remote devices 120A, 120B are qualified to share virtual desktop environments. In other embodiments, the host device 110 may detect that the two remote devices 120A, 120B are qualified to share virtual desktop environments, in response to which the host device 110 may offer the option (e.g., the option to share new or existing virtual desktop environments) to the remote devices 120A, 120B.

The remote device 120A, 120B may be qualified through their proximity. In some embodiments, the locations of the remote devices 120A, 120B may be determined through a locator component 126 on the remote devices 120A, 120B. The locator component 126 may be a radio frequency identification (RFID) device with both a RFID sensor and a RFID tag or a global position service (GPS) device or a similar device which is able to determine a location of the respective remote device 120, either in isolation or in comparison to another remote device 120. In other embodiments, the remote devices 120 may be reliably stationary (e.g., desktops which are bolted into a facility), and an initialization location process (e.g., a user entering GPS coordinates or a building and room number when connecting a stationary desktop to a network) may provide a location to the host device 110 which the session manager 116 may direct the processor 112 to store in a database 118. In certain embodiments, a remote device 120 may be connected to a wireless/Wi-Fi network for which a wireless access point is stored. In such embodiments, the wireless access point may allow the location of the remote device 120 to be determined using methods known to one skilled in the art. Other techniques for determining the location or proximity of the remote devices 120 are also possible.

For example, a first remote device 120A may access a hosted virtual desktop environment through the host device 110, after which the host device 110 may detect a request using an I/O interface 111 from a second remote device 120B. This request may be to share the hosted virtual desktop environment being access by the first device 120A or simply a request to access a hosted virtual desktop environment. In some embodiments, the host device 110 may determine the relative location of both remote devices 120A, 120B using information received from the two remote devices 120A, 120B. In other embodiments, one or both remote devices may determine the location and/or proximity of the remote devices 120A, 120B, which may then be transmitted using the I/O interface 121 to the host device 110.

The locator component RFID sensor 126A of the first remote device 120A may be able to detect the locator component RFID tag 126B of the second device 120B, and may determine that the second device 120B is within 5 feet of the first device 120A using techniques known to one skilled in the art. In some embodiments, the proximity of 5 feet may be transmitted along with the request to share the hosted virtual desktop environment. In other embodiments, the proximity of 5 feet may be sent to the host device 110 in response to the host device 110 querying for a proximity. In such embodiments, the host device 110 may query for a proximity in response to receive a request for access to a virtual desktop environment from the remote device 120. The host device 110 may use the proximity of five feet to determine that the second remote device 120B is qualified to share a virtual desktop environment with the first remote device 120A, and vice versa. Other embodiments where both remote devices 120A, 120B request using respective I/O interfaces 121A, 121B to share a virtual desktop environment at substantially the same time or both remote devices 120A, 120B were accessing independent virtual desktop environments through the host device 110 prior to sharing one or more virtual desktop environments are also possible.

In other embodiments, characteristics of the first remote device 120A and the second remote device 120B other than location are used to determine that the first and second remote devices 120A, 120B are qualified to share a virtual desktop environment. For example, the remote devices 120A, 120B may include an identifier component 128 which can verify the user of a remote device 120. The identifier 120 can include a biometric scanning device such as a fingerprint scanner or a retina scanner to identify a user. A database 118 may include user data, such as both the characteristics of a user (e.g., fingerprints, retina scans, passwords, security questions, etc.) and the cross-referenced list that identifies which users are allowed to share virtual desktop environments with each other. For example, user A may be allowed to share with user B, while user B is allowed to share with user C, though user C is not allowed to share with user A, all of which is recorded along with identifiers in the database 118.

For example, a host 110 may detect an incoming request for virtual desktop environments using an I/O interface 111 from a first remote device 120A and a second remote device 120B in quick succession. The two remote devices 120A, 120B may transmit requests using respective I/O interfaces 121A, 121B to share two virtual desktop environments. The host device 110 may detect that the two remote devices 120A, 120B are in the same room using location data from the locator components 126A, 126B, and also potentially using identification data from the identifier components 128A, 128B to determine that the same user is submitting both requests. In response to verifying that the proximity satisfies a threshold and that the same user is using both remote devices 120A, 120B, the host 110 may host two virtual desktop environments which are shared between the two remote devices 120A, 120B. In some embodiments the host 110 may use both location and identification information to verify that the remote devices 120A, 120B may share a virtual desktop environment. In other embodiments, the host 110 may use either location or identification information (and not the other) before granting both remote devices 120A, 120B access to a shared virtual desktop environment.

Consistent with various embodiments, the host device 110 and the remote devices 120 may be computer systems, and may each be equipped with a display or monitor. The computer systems may include at least internal or external network interface or communications devices (e.g., modem, network interface cards), optional input devices (e.g., a keyboard, mouse, touchscreen, or other input device), and commercially available or custom software (e.g., browser software, communications software, server software, natural language processing software, search engine and/or web crawling software, filter modules for filtering content based upon predefined criteria). The computer systems may include servers, desktops, laptops, tablets, gaming consoles, and hand-held devices.

Figure 2:
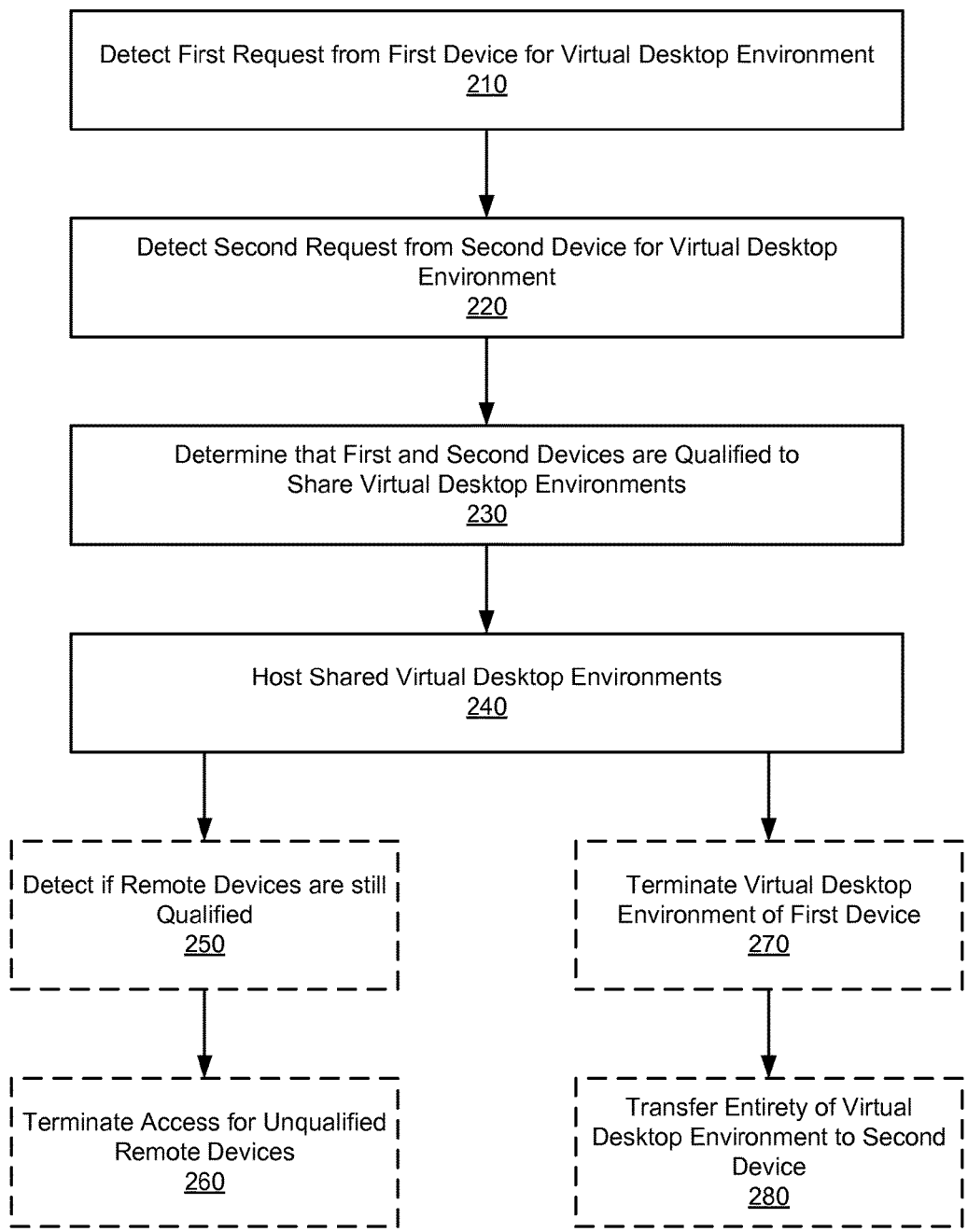
FIG. 2 depicts a method of managing virtual desktop infrastructure implementation, according to embodiments.

FIG. 2 is a flowchart illustrating a method 200 for managing VDI. A VDI server may execute method 200. The VDI server may be substantially similar to the host device 110 of FIG. 1. The VDI server may manage virtual desktop environment requests from remote computing devices. The remote computing devices may be substantially similar to the remote devices 120 of FIG. 1. Remote devices 120 may share a virtual desktop computing environment, hereinafter referred to as a virtual desktop, when properly qualified by the VDI server. Blocks with hashed lines in FIG. 2 may be optional operations within method 200. The visual arrangement of blocks in the flowchart of FIG. 2 is not to be construed as limiting the order in which the individual acts/operations may be performed, as certain embodiments may perform the operations of FIG. 2 in alternative orders or simultaneously.

At block 210 a first request to host a virtual desktop is detected by the VDI server. In some embodiments a virtual desktop may be a computing desktop environment which is provided to a remote device by a host VDI server using virtual machines (e.g., the computing desktop environment is on a virtual machine hosted by the VDI server). The first request comes from a first remote device. The first request may relate to the VDI server hosting an individual virtual desktop which will not be shared, or the first request may relate to the VDI server hosting one or more virtual desktops which will be shared.

The first request may include data related to the first device. The data may include the location of the first device and/or identification information on the user of the first device. For example, the data may include GPS data that provides the location of the first device in embodiments where the first device has a GPS component. Alternatively, in embodiments where the first device is stationary (e.g., the first device is a desktop computer which has been bolted down in a computer lab of a facility), the first data may include facility/building/room data which indicates a location of the first device. Other sources of location data can also be used in other embodiments, as discussed above.

The data may also include identification of the user or of a session of the user. For example, the first remote device may provide username/password data, biometric data, security question data, or other types of user data. The VDI server may use this data to identify the user. Likewise, the VDI server may use this data to identify a session/project of the user, rather than the identity of the user himself. The VDI server may use this identification to determine if a future user/session is qualified to share a virtual desktop.

In some embodiments, the VDI server may host a first virtual desktop in response to receiving the first request using techniques known to one skilled in the art. The first remote device may connect to the first virtual desktop, and may therein use the first virtual desktop. In some instances, the first virtual desktop may not initially be configured for sharing with other remote devices. In other instances, the first virtual desktop may be initially configured to be shared. The VDI server may configure the first virtual desktop to be shared in response to user input (e.g., data of the first request that specified that the first virtual desktop be configured for sharing) or in response to data of a VDI database (e.g., data of the first request, when cross-referenced to a database such as the database 118 of FIG. 1, specified that the user/session is qualified for sharing virtual desktop), among other reasons for configuring the virtual desktop for sharing. In certain embodiments, all virtual desktops may be configured for sharing, such that after the VDI server qualifies two remote devices as being qualified for sharing, a provided virtual desktop may be shared between said two remote devices.

At block 220 a second request for hosting virtual desktops is detected. The second request comes from a second remote device. The second request may be substantially similar to the first request above, such that the second request includes locating/identifying data as described herein and may relate to a virtual desktop which is configured to be shared or is not configured to be shared. In some embodiments, the VDI server may create a second virtual desktop for the second remote device as described herein.

In certain embodiments, the second request may be dissimilar to the first request. In such embodiments, the first request may request a first virtual desktop, while the second request may request access to the first virtual desktop. The request may include a specification that the first device maintain access to the first virtual desktop while the second device gains access to the virtual desktop. The access held by either or both the first and second device to the first virtual desktop may be full or partial access to the first virtual desktop. For example, the second request may specify that either or both the first and second remote device may be able to read data, write data, or access certain applications of the first virtual desktop, among other possible access differentiations. Alternatively, the first request may include no location of the first remote device, while the second request includes a relative proximity of both the first and the second device (e.g., using RFID components of the first and second remote device).

For example, a first user XX may make a first request to the VDI server to create a virtual desktop for a desktop computer of the first user XX. The request may specify a desire of the first user XX to have a first virtual desktop to be used exclusively by first user XX on the desktop computer. The VDI server may create this first virtual desktop which is accessed by first user XX through the desktop computer. The VDI may then detect a second request from the first user XX. The second request may specify a desire of the user XX to provide full access of the first virtual desktop to the tablet, while maintaining the full access of the desktop computer to the virtual desktop. The second request may include location data. For example, the location data can include relative location or proximity between the first device (e.g., the desktop) and the second device (e.g., the tablet) in some embodiments. In other embodiments, the location data includes a respective location for each device and the host determines the relative proximity of the devices based on the location data. The location data can be obtained using techniques known to one of skill in the art, such as through the use of a GPS receiver, RFID components, etc., as discussed above.

At block 230 the VDI server determines that the first and second devices are qualified to share access to virtual desktops. In some embodiments, the VDI server determines that the first and second devices are qualified based on the distance between the first and second devices satisfying a proximity threshold. For example, in some embodiments, a proximity threshold may be satisfied by the first and second remote devices being with a predetermined distance of each other, regardless of where the first and second remote devices are located while being within the predetermined distance of each other (e.g., two devices may satisfy the proximity threshold so long as said two devices are within ten feet of each other, regardless of geographical location of the devices at the moment of request). In other embodiments, the proximity threshold may be satisfied by the first and second remote devices both being within a predetermined area, regardless of the respective positions of the first and second devices within that predetermined area while the virtual desktop is shared (e.g., two devices may satisfy the proximity threshold by both being within a given room/building/facility, regardless of the relative proximity within said room/building/facility).

For example, a VDI server may use a proximity threshold of being in a same room (e.g., a proximity threshold for two devices is satisfied when said two devices are both within a single room). The VDI server may detect a first remote device sending in a first request at block 210, identifying the first device as being within room D201 of building 006 (e.g., through a determination that the first device is bolted down within room D201 of building 006 as communicated by the first request). A second remote device may send in a second request at block 220, identifying itself as being within room D201 of building 006. Regardless of the size of the room or the relative position of the first and second devices within the room, the VDI servers determines that the proximity threshold is satisfied, in some embodiments, if both devices are in the same room. For example, even if the room is 100 feet long and the two remote devices are in opposite corners, the VDI server may identify the two devices as being within the same room (e.g., room D201) and, thus, determine that the two remote device satisfy the proximity threshold.

In some embodiments, the VDI server may use data other than or in addition to location data to determine that remote devices are qualified to share a virtual desktop. For example, a VDI server may determine that remote devices are qualified to share a virtual desktop when both remote devices are shared by the same user. The user may be identified by usernames, passwords, security questions, biometric data, or any other identification/validation technique known to one skilled in the art. The VDI server, in some such embodiments, may only qualify the second remote device as having the authority to share a virtual desktop with the first remote device when the two remote devices both satisfy the proximity threshold and also are operated by the same user. In other embodiments, the VDI server may qualify the second device as having the authority to share a virtual desktop with the first remote device purely on the basis of said remote devices being operated by the same user.

In other embodiments, the VDI server may qualify the second remote device through all users identifying a same session. For example, if numerous coworkers are all working on a single project and wish to have full or partial access to a specific virtual desktop which is being operated by a first remote device, the numerous coworkers may use a plurality of devices to access the specific virtual desktop. The VDI server may require the numerous coworkers to offer validation (e.g., project names, project passwords, project keys, etc.) to qualify the devices of the numerous coworkers to access the specific virtual desktop.

At block 240 the VDI server hosts one or more shared virtual desktops. The VDI server may allow all qualified remote devices to access the virtual desktop. The VDI server may host a single virtual desktop which is shared and displayed equally between the remote devices. Alternatively, the VDI may host a single virtual desktop which is primarily on one remote device and extended onto a second remote device. The VDI may also host a plurality of virtual desktops which share portions of a main virtual desktop. Techniques for hosting the shared virtual desktops are described in more detail with respect to FIGS. 3A-D. In some embodiments, the first remote device (e.g., the remote device that initially utilized the virtual desktop) may be provided an option with how to divide/host/share the virtual desktop. In other embodiments, in response to hosting the virtual desktop environment, one or more specified users (e.g., users who provided identification data to the host device which matched a qualified user profile of the database 118 of the host device) may be granted the ability to reconfigure how the virtual desktop environment is divided/hosted/shared among the remote devices. Other ways known to one of skill in the art of modifying the division/hosting/sharing of the virtual desktop environment among the remote devices are also possible.

At block 250, the VDI server may determine if the remote devices are still qualified to share the virtual desktop environment. The VDI server may detect at block 250 that a remote device is failing the proximity threshold after initially satisfying the proximity threshold (e.g., one remote device being moved away from the other remote device). The VDI server may detect the remote device failing by regularly verifying/gathering locations of the remote devices which access the shared virtual desktop. In response to detecting the proximity threshold failure, the VDI server may disconnect/suspend the access of the failing remote to the virtual desktop at block 260. The VDI server may regularly check the locations of remote devices to verify a continued satisfaction of the proximity threshold, in some embodiments checking the locations at predetermined intervals.

For example, a VDI server may have a proximity threshold of 10 feet. The VDI server may detect that a second device is within 5 feet of a hosted first device, and that the second device has sent a request to access the first device. In response to determining that the same user is operating both devices, the VDI server may determine the second device to be qualified to access the virtual desktop of the first device, and may host the shared virtual desktop such that both first and second device have access. The VDI server may then gather new locations of the first and second devices a short time later following a predetermined time interval, determine that the new locations fail the proximity threshold, and suspend the shared access to the virtual desktop. Suspending the shared access may mean that neither remote device may access any data of the virtual desktop, devices which fail the proximity threshold cannot access any data of the virtual desktop, or disallowing write access to the shared desktop, among other possibilities. In some embodiments, where a first remote device initially had exclusive access to a virtual desktop and a second remote device later gained access to the hosted virtual desktop, a failure of the two remote devices to satisfy a proximity threshold may result in the VDI server reverting to the initial configuration where the first remote device had exclusive access to the virtual desktop.

At block 270 the VDI server may terminate the access of the first device to the virtual desktop, where the virtual desktop was initially exclusively access by the first device. The VDI server may terminate the access of the first device in response to the first device turning off or otherwise failing conditions of accessing the virtual desktop (e.g., the first remote device no longer having network access to the VDI server).

In response to the VDI server detecting that the first device no longer has access to the virtual desktop, at block 280 the VDI server may give exclusive access to the second remote device. In this way a shared virtual desktop may act as a way for a virtual desktop to be transferred from an initial device to a successive device after a period of being shared.

Figure 3A:
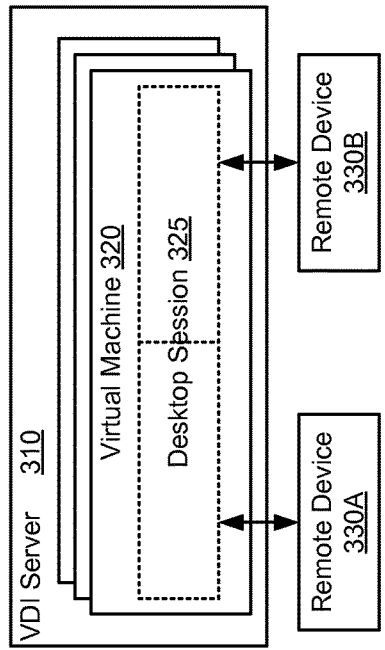
FIG. 3A depicts a host providing separate virtual computer desktop environments to two hosts, according to embodiments.

FIG. 3A depicts a host providing separate virtual desktops to two hosts. The host is depicted as a VDI server 310, which is consistent with VDI servers as discussed in method 200. The VDI server 310 may be equivalent to the host 110 of FIG. 1. The VDI server creates and/or manages a series of virtual machines 320. The virtual machines 320 host one or more virtual desktops 325 for remote devices 330. The remote devices 330 may be equivalent to the remote devices 120 of FIG. 1. The VDI server 310 may detect requests from a first remote device 330A and a second remote device 330B. Both requests may relate to gaining access to virtual desktops 325. In response to these detected requests, the VDI server 310 may host individual virtual desktops 325A, 325B for the two remote devices 330A, 330B, respectively. In particular, in the example shown in FIG. 3A, the virtual machines 320 host virtual desktop session 325A for remote device 330A and virtual desktop session 325B for remote device 330B.

Figure 3B:
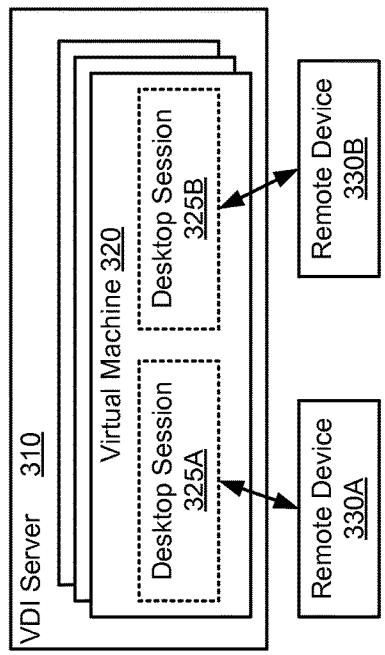
FIG. 3B depicts a host providing a split virtual computer desktop environments to two hosts, according to embodiments.

At FIG. 3B the VDI server 310 may detect that remote device 330A and remote device 330B satisfy a proximity threshold. The VDI server 310 may determine this in response to one or both of remote devices 330A and 300B submitting a request to share a virtual desktop 325 which includes location data regarding both devices which satisfies the proximity threshold. The VDI server 310 may provide a single virtual desktop 325 which is partially on a first remote device 330A and extended onto a second remote device 330B. By extending a remote desktop 325 from one remote device 330A to a second remote device 330B, the VDI server may allow both remote devices 330 to see separate screens (e.g., screens which are not replicated from one device 330A to a second device 330B) while sharing single data instances. For example, a first remote device 330A may work on a document/application and then pass said document/application along the extended screen to the second remote device 330B. While FIG. 3B depicts two remote devices 330A, 330B sharing the virtual desktop 325, more devices are possible in other embodiments.

Figure 3C:
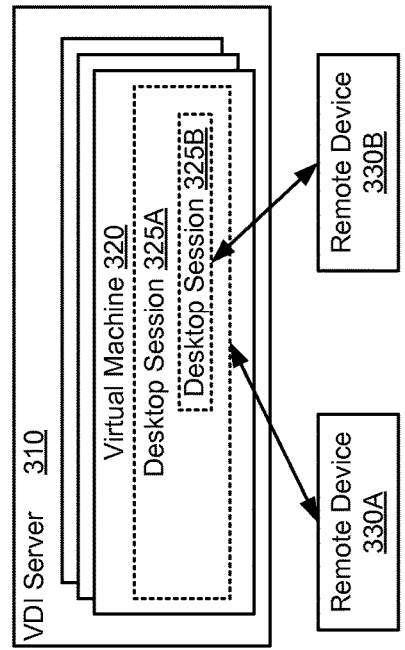
FIG. 3C depicts a host providing a shared virtual computer desktop environments to two hosts, according to embodiments.

At FIG. 3C the VDI server 310 may share the virtual desktop 325 equally between the two remote devices 330A, 330B. Sharing the virtual desktop 325 equally may result in all remote devices 330 which have access to the virtual desktop 325 seeing the same screen. Allowing all remote devices 330 to see the same screen may result in increased collaboration and data fidelity among remote devices 330.

Figure 3D:
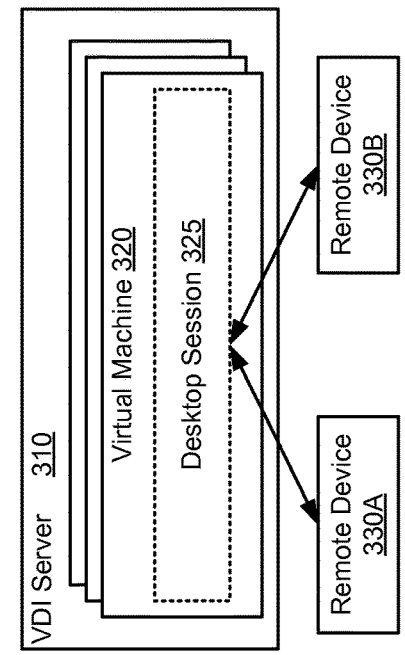
FIG. 3D depicts a host providing an apportioned virtual computer desktop environments to two hosts, according to embodiments.

At FIG. 3D the VDI server 310 apportions virtual desktops 325 between remote devices 330. Apportioning virtual desktops 325 may entail allowing one remote device 330A a fully spectrum of access and capabilities of a virtual desktop 325A, while allowing a second remote device 330B a subset of access and capabilities of the first virtual desktop 325A within a second virtual desktop 325B. For example, the first remote device 330A may be able to access application A, application B, and document C within the first virtual desktop 325A. Conversely, the second remote device 330B may only be able to access document C within the second virtual desktop 325B. The first remote device 330A may limit the access of the second virtual desktop 325B. In some embodiments, the device which limits access to a virtual desktop may be the device which initially was granted access to a virtual desktop environment that was hosted by the VDI server. For example, the first remote device 330A may have greater access within its respective virtual desktop 325A in response to the first remote device 330A sending the initial request to create virtual desktop 325 to the VDI server.

The functionality outlined in the discussions herein regarding FIG. 1, FIG. 2, FIG. 3A, FIG. 3B, FIG. 3C, and FIG. 3D above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in the computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of managing virtual desktop infrastructure (VDI) implementation, the method comprising:
   detecting, from a first remote device, a first request related to hosting one or more computing desktop environments within a virtual machine for the first remote device, wherein the first remote device is at a first location;
   detecting, from a second remote device, a second request relating to hosting one or more computing desktop environments within the virtual machine for the second remote device, wherein the second remote device is at a second location;
   determining, by a host device and with reference to a database which includes data on qualifications to share computing desktop environments and based at least in part on identifying that the first location and the second location are close enough together to satisfy a proximity threshold, that the first and second remote device are qualified to share computing desktop environments;

hosting, by the host device, one or more computing desktop environments which are shared by both the first remote device and the second remote device in response to determining that the first and second remote device are qualified to share computing desktop environments;

hosting a first computing desktop environment for the first remote device in response to receiving the first request;

wherein hosting one or more computing desktop environments includes configuring the first computing desktop environment to be shared by both the first remote device and the second remote device, and wherein the configuring the first computing desktop environment to be shared includes configuring the first computing desktop environment to be displayed equally on the first remote device and the second remote device or to be displayed partially on the first remote device and extended onto the second remote device;

gathering respective new locations of the first and second remote devices;

verifying, at predetermined time intervals, a continued satisfaction of the proximity threshold by the first and second remote devices;

determining, by identifying that the respective new locations are no longer close enough to satisfy the proximity threshold, that the first and second device are no longer qualified to share computing desktop environments;

terminating access of the first remote device to the first computing desktop environment; and maintaining access of the second remote device to the first computing desktop environment.

2. The method of claim 1, wherein determining that the first and second remote device are qualified to share computing desktop environments further comprises:

identifying a user of the first remote device and a user of the second remote device; and determining that the user of the first remote device and the user of the second remote device are qualified to share computing desktop environments.

3. The method of claim 2, wherein determining that the user of the first remote device and the user of the second remote device are qualified to share computing desktop environments further comprises determining that the user of the first remote device is the user of the second remote device.

4. The method of claim 1, wherein hosting the one or more computing desktop environments which are shared by both the first remote device and the second remote device further comprises:

hosting a first computing desktop environment with a set of functionalities that is accessed by the first remote device; and hosting a second computing desktop environment with a subset of the set of functionalities that is accessed by the second remote device, wherein the subset of the set of functionalities is determined by the first remote device.

5. The method of claim 1, further comprising:

detecting, from a third remote device, a third request relating to hosting one or more computing desktop environments within the virtual machine for the third remote device, wherein the third remote device is at a third location;

determining, by identifying that the first location and the second location are both close enough to the third location to satisfy the proximity threshold, that the third remote device is qualified to share computing desktop environments with the first and second remote device; and hosting one or more computing desktop environments which are shared by the first, second, and third remote device in response to determining that the third remote device is qualified to share computing desktop environments with the first and second remote devices.

6. A system, comprising:

a processor; and a memory coupled to the processor, wherein the memory comprises instructions which, when executed by the processor, cause the processor to:

detect, from a first remote device, a first request related to hosting one or more computing desktop environments within a virtual machine for the first remote device, wherein the first remote device is at a first location;

detect, from a second remote device, a second request relating to hosting one or more computing desktop environments within the virtual machine for the second remote device, wherein the second remote device is at a second location;

determine, by a host device and with reference to a database which includes data on qualifications to share computing desktop environments and based at least in part on identifying that the first location and the second location are close enough together to satisfy a proximity threshold, that the first and second remote device are qualified to share computing desktop environments;

host, by the host device, one or more computing desktop environments which are shared by both the first remote device and the second remote device in response to determining that the first and second remote device are qualified to share computing desktop environments;

host a first computing desktop environment for the first remote device in response to receiving the first request;

wherein hosting one or more computing desktop environments includes configuring the first computing desktop environment to be shared by both the first remote device and the second remote device, and wherein the configuring the first computing desktop environment to be shared includes configuring the first computing desktop environment to be displayed equally on the first remote device and the second remote device or to be displayed partially on the first remote device and extended onto the second remote device;

gather respective new locations of the first and second remote devices;

verify, at predetermined time intervals, a continued satisfaction of the proximity threshold by the first and second remote devices;

determine, by identifying that the respective new locations are no longer close enough to satisfy the proximity threshold, that the first and second device are no longer qualified to share computing desktop environments;

terminate access of the first remote device to the first computing desktop environment; and maintain access of the second remote device to the first computing desktop environment.

7. The system of claim 6, wherein the memory further comprises instructions which, when executed by the processor, cause the processor to determine that the first and second remote device are qualified to share computing desktop environments by being further configured to:

identify a user of the first remote device and a user of the second remote device; and determine that the user of the first remote device and the user of the second remote device are qualified to share computing desktop environments by determining that the user of the first remote device is the user of the second remote device.

8. The system of claim 6, wherein the memory further comprises instructions which, when executed by the processor, cause the processor to host the one or more computing desktop environments which are shared by both the first remote device and the second remote device by being further configured to:

host a first computing desktop environment with a set of functionalities that is accessed by the first remote device; and host a second computing desktop environment with a subset of the set of functionalities that is accessed by the second remote device, wherein the subset of the set of functionalities is determined by the first remote device.

9. The system of claim 6, wherein the memory further comprises instructions which, when executed by the processor, cause the processor to:

detect, from a third remote device, a third request relating to hosting one or more computing desktop environments within the virtual machine for the third remote device, wherein the third remote device is at a third location;

determine, by identifying that the first location and the second location are both close enough to the third location to satisfy the proximity threshold, that the third remote device is qualified to share computing desktop environments with the first and second remote device; and host one or more computing desktop environments which are shared by the first, second, and third remote device in response to determining that the third remote device is qualified to share computing desktop environments with the first and second remote devices.

10. A computer program product for managing virtual desktop infrastructure, the computer program product disposed upon a computer readable storage medium, the computer program product comprising computer program instructions that, when executed by a computer processor of a computer, cause the computer to:

detect, from a first remote device, a first request related to hosting one or more computing desktop environments within a virtual machine for the first remote device, wherein the first remote device is at a first location;

detect, from a second remote device, a second request relating to hosting one or more computing desktop environments within the virtual machine for the second remote device, wherein the second remote device is at a second location;

determine, by a host device and with reference to a database which includes data on qualifications to share computing desktop environments and based at least in part on identifying that the first location and the second location are close enough together to satisfy a proximity threshold, that the first and second remote device are qualified to share computing desktop environments;

host, by the host device, one or more computing desktop environments which are shared by both the first remote device and the second remote device in response to determining that the first and second remote device are qualified to share computing desktop environments;

host a first computing desktop environment for the first remote device in response to receiving the first request;

wherein hosting one or more computing desktop environments includes configuring the first computing desktop environment to be shared by both the first remote device and the second remote device, and wherein the configuring the first computing desktop environment to be shared includes configuring the first computing desktop environment to be displayed equally on the first remote device and the second remote device or to be displayed partially on the first remote device and extended onto the second remote device;

gather respective new locations of the first and second remote devices;

verify, at predetermined time intervals, a continued satisfaction of the proximity threshold by the first and second remote devices;

determine, by identifying that the respective new locations are no longer close enough to satisfy the proximity threshold, that the first and second device are no longer qualified to share computing desktop environments;

terminate access of the first remote device to the first computing desktop environment; and maintain access of the second remote device to the first computing desktop environment.

11. The computer program product of claim 10, the computer program product further comprising computer program instructions that, when executed by the computer processor, cause the computer to determine that the first and second remote device are qualified to share computing desktop environments by further causing the computer to:

identify a user of the first remote device and a user of the second remote device; and determine that the user of the first remote device and the user of the second remote device are qualified to share computing desktop environments by determining that the user of the first remote device is the user of the second remote device.

12. The computer program product of claim 10, the computer program product further comprising computer program instructions that, when executed by the computer processor, cause the computer to host the one or more computing desktop environments which are shared by both the first remote device and the second remote device by causing the computer to:

host a first computing desktop environment with a set of functionalities that is accessed by the first remote device; and host a second computing desktop environment with a subset of the set of functionalities that is accessed by the second remote device, wherein the subset of the set of functionalities is determined by the first remote device.

13. The computer program product of claim 10, the computer program product further comprising computer program instructions that, when executed by the computer processor, cause the computer to:

detect, from a third remote device, a third request relating to hosting one or more computing desktop environments within the virtual machine for the third remote device, wherein the third remote device is at a third location;

determine, by identifying that the first location and the second location are both close enough to the third location to satisfy the proximity threshold, that the third remote device is qualified to share computing desktop environments with the first and second remote device; and host one or more computing desktop environments which are shared by the first, second, and third remote device in response to determining that the third remote device is qualified to share computing desktop environments with the first and second remote devices.

14. The method of claim 1, wherein the identifying that the first location and the second location are close enough together to satisfy a proximity threshold comprises identifying the first and the second location are both within a complex, a building, a room, or a non-structured radius.

15. The method of claim 1, wherein the first remote device contains a locator component for determining locations of the first remote device, the locator component selected from the group of a radio frequency identification device and a global position service device.

16. The system of claim 6, wherein the identifying that the first location and the second location are close enough together to satisfy a proximity threshold comprises identifying the first and the second location are both within a complex, a building, a room, or a non-structured radius.

17. The system of claim 6, wherein the first remote device contains a locator component for determining locations of the first remote device, the locator component selected from the group of a radio frequency identification device and a global position service device.

18. The computer program product of claim 10, wherein the identifying that the first location and the second location are close enough together to satisfy a proximity threshold comprises identifying the first and the second location are both within a complex, a building, a room, or a non-structured radius.

19. The computer program product of claim 10, wherein the first remote device contains a locator component for determining locations of the first remote device, the locator component selected from the group of a radio frequency identification device and a global position service device.

* * * * *